United States Patent Office 3,489,803
Patented Jan. 13, 1970

3,489,803
PROCESS FOR PREPARING ALKYLENE BIS(DI-HYDROCARBYL PHOSPHINE SULFIDES)
Ludwig Maier, Zurich, Switzerland, assignor to Monsanto Company, St. Louis, Mo., a corporation of Delaware
No Drawing. Filed Oct. 20, 1966, Ser. No. 587,994
Int. Cl. C07f 9/50
U.S. Cl. 260—606.5          7 Claims

ABSTRACT OF THE DISCLOSURE

Dithiophosphinites of formula $$R^1R^2P-S-R^3-S-PR^1R^2$$

diphosphine disulfides of formula $$R^1R^2P-R^3-PR^1R^2$$
$$\quad\;\; \| \qquad\quad\;\; \|$$
$$\quad\;\; S \qquad\quad\;\; S$$

and process for preparing by heating an aminophosphine of formula $R^1R^2PNR^4R^5$ with a dithiol of formula $HS-R^3-SH$ to split off ammonia or amine to give phosphinite and isomerizing the phosphinite to give the phosphine sulfide. The said disulfides find utility as additives to oils, lubricants, washing agents, textile agents, plasticizers, heat transferring fluids, wetting agents and dispersing agents.

---

The present invention concerns a process of preparing dithiophosphinites and ditertiary diphosphine disulfides of the formulas $$R^1R^2P-S-R^3-S-PR^1R^2 \text{ and } R^1R^2P-R^3-PR^1R^2$$
$$\qquad\qquad\qquad\qquad\qquad\qquad \| \qquad\quad\; \|$$
$$\qquad\qquad\qquad\qquad\qquad\qquad S \qquad\quad\; S$$

in which $R^1$ and $R^2$ signify possibly substituted hydrocarbyl groups, or together with P members of a heterocycle, and $R^3$ a hydrocarbylene group which contains the two phosphorus atoms each at a primary or secondary carbon atom.

Some of these compounds have been known hitherto. They have been prepared principally by reacting the hereafter cited reaction components: $R_2PX$ and $M-R-M$, with subsequent sulfidizing; $R_2PM$ and $X-R-X$, with subsequent sulfidizing; $R_2PX$ and $XMg-R-MgX$, with subsequent sulfidizing.

$$R_2PX \text{ and } SMg-R-MgX; X_2P-R-PX_2 \text{ and } RMgX; R_2P-PR_2 \text{ and } CH_2=CH_2$$
$$\| \qquad\qquad\qquad\qquad\quad \| \quad \| \qquad\qquad\qquad \| \quad \|$$
$$S \qquad\qquad\qquad\qquad\quad S \quad S \qquad\qquad\qquad S \quad S$$

wherein R represents in these formulae an organic group, X a halogen atom and M an alkali metal atom.

As it is evident, all these processes need a metalorganic compound. It has now been found that ditertiary diphosphine disulfides can be obtained in one reaction step with high yield if one brings to reaction an amino phosphine of the general formula $$R^1R^2PNR^4R^5$$

in which $R^1$ and $R^2$ are defined as above an $NR^4R^5$ represent an amino group which is derived from ammonia or from an easily distillable primary or secondary amine, with a dithiol of the general formula $$HS-R^3-SH$$

in which $R^3$ signifies a hydrocarbyl group containing the two mercapto groups each attached to a primary or secondary aliphatic carbon atom, by heating said reactants preferably in a molar proportion of about 2:1 until no more essential quantity of ammonia or amine splitting off during the reaction is released from the reaction mixture, and one isomerizes the formed di-thiophosphinite belonging to a class of compounds which was unknown hitherto, in a manner which is known per se.

The reaction of invention proceeds according to the following scheme:

$$2R^1R^2PNR^4R^5 + HS-R^3-SH \longrightarrow$$
$$\qquad\qquad R^1R^2P-S-R^3-S-PR^1R^2 + 2HNR^4R^5$$

$$R^1R^2P-S-R^3-S-PR^1R^2 \xrightarrow{\text{Isomerization}} R^1R^2P-R^3-PR^1R^2$$
$$\qquad\qquad\qquad\qquad\qquad\qquad\qquad\qquad\quad \| \qquad\quad \|$$
$$\qquad\qquad\qquad\qquad\qquad\qquad\qquad\qquad\quad S \qquad\quad S$$

While the isomerization of phosphinites generally proceeds well by means of alkyl halides, this is usually not the case for the corresponding thiophosphinites. For the derivatives which are aliphatically substituted on the sulfur there is need for an isomerization catalyst and side reactions do occur, in which quaternary phosphonium halides and in some cases also tertiary phosphines and phosphinic acids are formed.

The di-thiophosphinites which are formed intermediarily in the present process isomerize without catalyst by simple heating with practically quantitative yields. This is also true for $R^3$ being an alkylene.

The amino phosphines serving as starting products are known. They can be prepared especially suitably according to copending U.S. patent application Ser. No. 371,735, filed June 1, 1964, of the same inventor.

Examples for the amino group $NR^4R^5$ are $NH_2$, methylamino, dimethylamino, ethylamino, diethylamino, anilino and methylanilino.

As it is evident from the reaction scheme, the amino group is split off during the reaction as ammonia or amine. By continuously removing the amine which is formed, the reaction will be promoted. Generally, it is desirable that this amine is easily distillable and shows a lower boiling point than the dithiol to be reacted.

Examples for the $R^1$ and $R^2$ groups which appear in the starting products are: alkyls, alkenkyls and alkylnyls such as methyl, ethyl, vinyl, ethynyl, N-propyl, iso-propyl, allyl, propenyl propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl, tetracosyl; moreover cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic groups having up to 12 carbon atoms such as cyclooctyl, cyclododecyl, cyclooctatrienyl, cyclododecatrienyl, bicyclohexyl; moreover aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1- phenylpropynyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1-(β-naphthyl)ethyl, 2-(β-naphthyl)ethyl, 1-(α-naphthyl)ethenyl, 2-(α-naphthyl)ethenyl, 1-(β-naphthyl)ethenyl, 2-(β-naphthyl)ethenyl, α-naphthylethynyl, β-naphthylethynyl; moreover alkaryls, alkenylaryls and alkynylaryls such as tolyl, xylyl, mesityl, duryl, ethylphenyl, cumyl, vinylphenyl, ethynyphenyl, propargylphenyl, propynyphenyl, tert-butylphenyl, α-vinylnaphthyl, β-vinyl-taphthyl, α-ethyaylnaphthyl, β-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthral, 9-anthryl, 1-phenanthryl, 2-phenanthryl, 3-phenanthryl, 4-phenanthryl, 9-phenanthryl; moreover heterocyclic groups such as pyrril, furyl, benzofuryl, thienyl, pyrrolinyl, pyrazolyl, pyrazolinyl, imidazolyl, benzimidazolyl, thiazolyl, oxazolyl, iso-oxazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl, phenazinyl, carbazolyl and the like.

It has been found that the enumerated hydrocarbon groups and heterocyclic groups can also show substituents and that these substituents do not hinder the reaction. Examples of possible substituents are: Cl, Br. I, F, —OR, —SR, —COR, —CSR, —COOR, —OCOR, —CONR$_2$, —NR$_2$, —CN, —NO$_2$, —SOR, —SO$_2$R, —SO$_2$OR, —SO$_2$NR$_2$ and =NR. (R is a hydrocarbyl group or heterocyclic group).

Dithiols whose mercapto groups are attached each to a primary or secondary aliphatic carbon atom, are taken in consideration as second reaction components. Examples are 1,2-dimercaptoethane, 1,3-dimercaptopropane, 1,2-dimercaptopropane, 1,4-dimercaptobutane, 1,3-dimercaptobutane, 1,2-dimercaptobutane and so on to dithiols having about 24 carbon atoms in the chain such as ω-dimercaptotetracosane, 1,20 - dimercapto-4,8,13,17-tetramethyleicosane; moreover cycloaliphatic dithiols such as 1,2-dimercaptocyclopentane, 1,2- or 1,3-dimercaptocyclohexane, 1,1'-dimercaptodicyclohexyl, 1,1'-dimercaptodicycloheptyl, 1,4-, 2,3- or 5,8-dimercaptohexalin; moreover mixed aliphatic-cycloaliphatic and aliphatic-aromatic dithiols such as 1,2-dimercapto-1-cyclopropyl-ethane, 1,1-dimercaptomethylcyclobutane, 1,1-dimercaptomethylcyclohexane, 1,3 - di-β-mercaptoethyl-benzene, 1,3 - di-α - mercaptoisopropylbenzene, 2,2'dimercaptomethyldiphenyl and the like.

On carrying out the invention practically, it is sufficient to convert by heating an amino phosphine with a suitable dithiol first to the corresponding di-thiophosphinite. Generally, temperatures of about 100° to 200° C. have to be applied. The reaction can be carried out with or without an inert solvent. Suitable solvents are benzene, toluene, xylene, diphenyl, terphenyl, tetralin, hexalin, 1-methylnaphthalene, 1,4-dimethylnaphthalene, 1-ethyl-naphthalene, 2-ethylnaphthalene, 1-fluoronaphthalene, moreover high boiling ethers such as dibutylether, diphenylether, diphenoxybenzenes and the like. If the reaction components are liquid at the reaction temperature, one can work without a solvent. The course of the reaction can be controlled by determination of the quantity of amine cleaved off. Depending on the reaction temperature, the di-thiophosphinite which is formed intermediarily can isomerize immediately to the ditertiary diphosphine disulfide. If the di-thiophosphinite is still present, the reaction mixture can be heated for some time at a higher temperature, e.g. at 210°-250° C. to isomerize it.

If it is desirable to prepare first the dithiophosphinite and to isolate and purify it, the first reaction step is suitably carried out at low temperatures, e.g. at 60°-100° C.

The isomerization proceeds more or less easily depending on the substituents present. At higher temperatures it can be terminated after about 10 minutes to several hours.

The ditertiary diphosphine disulfides, which are obtainable according to the present invention, can serve as additives for oils, lubricants, washing agents, textile agents, plasticizers, heat transferring fluids, wetting agents and dispersing agents; they form with metals and metal salts, especially also with transition metals and transition metal salts, complex compounds and can be used, e.g., the extraction of metal salts; moreover they are able to display biological properties and can be utilized, e.g., as bactericides, herbicides, fungicides and insecticides. As intermediate products they can be converted into the analogues which are free from sulfur or into analogues which contain oxygen instead of sulfur.

Ditertiary diphosphine disulfides which contain a greater alkyl group than butyl at each phosphorus atom or a greater alkylene group than hexamethylene between the two phosphorus atoms, have not been known hitherto. Such compounds are especially suitable as washing agents or additives to washing agents, because they are surface-active and display simultaneously bactericidal properties.

EXAMPLE 1

A mixture of 11.46 g. (0.05 mole) of

and 2.35 g. (0.025 mole) of HSCH$_2$CH$_2$SH is heated at 130° C. for 2 hours in a nitrogen atmosphere. There are evolved 2.1 g. (93%) of dimethylamine.

For the isomerization of possible still present dithiophosphinite, the mixture is heated at 200° C. for 20 minutes. One obtains 1,2-bis-(diphenylthiophosphinyl)-ethane. The yield is quantative; B.P. $_{0.002}$ 220°–235° C.; M.P. 205°–207° (from benzene).

In about same manner are obtained:

| | M.P., °C. | Yield, percent |
|---|---|---|
| 1,2-bis-(dimethylthiophosphinyl)-ethane | 261–263 | 96 |
| 1,2-bis-(diethylthiophosphinyl)-ethane | 86 | 88.5 |
| 1-3-bis-(dicyclohexylthiophosphinyl)-propane | 147–147.5 | 94.8 |
| 1,3-bis-(phenyl-ethylthiophosphinyl)-propane | 140–142 | 97.6 |
| 1,4-bis-(phenyl-methylthiophosphinyl)-butane | 137–138 | 94.3 |
| 1,4-bis-(phenyl-cyclohexylthiophosphinyl)-butane | 249–250.5 | 79.1 |
| 1,5-bis-(diethylthiophosphinyl)-pentane | 112–112.4 | 85.8 |
| 1,5-bis-(phenyl-ethylthiophosphinyl)-pentane | 113–114 | 92.6 |
| 1,5-bis-(dicyclohexylthiophosphinyl)-pentane | 184.5 | 89.4 |
| 1,6-bis-(phenyl-methylthiophosphinyl)-hexane | 138–145 | 72.5 |
| 1,6-bis-(pentamethylenethiophosphinyl)-hexane | 175 | 88.2 |

If one adds to the reaction mixture as catalyst the dibromide which corresponds to the alkylene, the isomerization proceeds faster, and the analogous dichloride or diodides are also catalysts, i.e., compounds of the formula X–R$^3$–X wherein X is a chlorine, bromine or iodine atom; however, the dibromides are preferred.

What I claim is:

1. A process for preparing tertiary phosphine sulfides of the formula

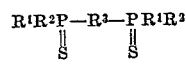

wherein R$^1$ and R$^2$ are each hydrocarbyl groups and R$^3$ is a hydrocarbylene group with each phosphorus atom being attached by primary or secondary aliphatic carbon atoms, comprising heating an aminophosphine of the formula R$^1$R$^2$PNR$^4$R$^5$ wherein R$^1$ and R$^2$ are as defined herein above and NR$^4$R$^5$ represents an amino group derived from ammonia or a primary or secondary amine, with a dithiol of the formula HS–R$^3$–SH wherein R$^3$ is as defined hereinabove, at a temperature sufficient to esplit off ammonia or amine and form dithiophosphinite, and isomerizing the dithiophosphinite to phosphine sulfide.

2. A process of claim 1 wherein the reactions are carried out in the presence of an inert atmosphere.

3. A process of claim 1 wherein the molar proportion is about 2:1 aminophosphine to dithiol.

4. A process of claim 1 wherein the reactions are carried out in the range of 100° to 250° C.

5. A process of claim 1 wherein an isomerization catalyst is used to promote the reaction, which catalyst is of the formula X–R$^3$–X with R$^3$ being the same as that of the dithiol and X being a chlorine, bromine or iodine atom.

6. A process of claim 5 wherein the isomerization catalyst is present during the reaction of the aminophosphine and dithiol.

7. A process of claim 1 wherein $R^1$ and $R^2$ are each phenyl, methyl, ethyl, cyclohexyl or when taken together pentamethylene, $R^3$ is alkylene having from 2 to 6 carbon atoms, $R^4$ and $R^5$ are each hydrogen atoms, methyl, ethyl or phenyl, the molar ratio of aminophosphine to dithiol is about 2:1, the heating is in the range of 100° to 250° C. and the reactions are carried out in the presence of an inert atmosphere.

References Cited

UNITED STATES PATENTS

| 2,642,461 | 6/1953 | Morris et al. | 260—606.5 |
| 3,086,053 | 4/1963 | Wagner et al. | 260—606.5 |

DELBERT E. GANTZ, Primary Examiner

W. F. W. BELLAMY, Assistant Examiner

U.S. Cl. X.R.

260—928